US009657636B2

(12) United States Patent
Matthews et al.

(10) Patent No.: US 9,657,636 B2
(45) Date of Patent: May 23, 2017

(54) WASTEGATE ASSEMBLY IN A TURBINE (71) Applicant: Ford Global Technologies, LLC, Dearborn, MI (US)

(72) Inventors: Patrick Matthews, West Bloomfield, MI (US); Patrick James Hertrich, Novi, MI (US); Daniel Lawerence Sylvester, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 399 days.

(21) Appl. No.: 14/530,227

(22) Filed: Oct. 31, 2014

(65) Prior Publication Data

US 2016/0123222 A1   May 5, 2016

(51) Int. Cl.
*F02D 23/00* (2006.01)
*F02B 37/18* (2006.01)

(52) U.S. Cl.
CPC ........... *F02B 37/183* (2013.01); *Y02T 10/144* (2013.01)

(58) Field of Classification Search
CPC .............................. F02B 37/183; Y02T 10/144
See application file for complete search history.

(56) References Cited

U.S. PATENT DOCUMENTS

| 4,098,085 | A | * | 7/1978 | McDowell | F02B 37/18 137/527 |
|---|---|---|---|---|---|
| 4,256,285 | A | | 3/1981 | Davidson | |
| 4,463,564 | A | * | 8/1984 | McInerney | F01D 17/105 137/892 |
| 4,794,758 | A | * | 1/1989 | Nakazawa | F01D 17/18 60/602 |
| 2009/0151352 | A1 | * | 6/2009 | McEwan | F01D 17/105 60/602 |
| 2012/0234002 | A1 | | 9/2012 | Lombard et al. | |
| 2012/0312010 | A1 | | 12/2012 | Yasoshima | |
| 2013/0167527 | A1 | | 7/2013 | Cattani et al. | |
| 2013/0305711 | A1 | | 11/2013 | Lueddecke et al. | |
| 2014/0072412 | A1 | | 3/2014 | Marques et al. | |
| 2015/0345375 | A1 | * | 12/2015 | Grabowska | F02B 37/183 415/148 |

* cited by examiner

*Primary Examiner* — Jesse Bogue
(74) *Attorney, Agent, or Firm* — Julia Voutyras; McCoy Russell LLP (57) ABSTRACT

A wastegate assembly in a turbine of an internal combustion engine is provided. The wastegate assembly includes a wastegate conduit bypassing a turbine rotor, a valve sealing plate configured to seat and seal on a wastegate conduit outlet in a closed position, and a flow diverting tab coupled to the valve sealing plate, extending upstream of the wastegate conduit outlet, and separating a wastegate conduit outflow and a turbine rotor outflow.

18 Claims, 6 Drawing Sheets

WASTEGATE ASSEMBLY IN A TURBINE

FIELD

The present disclosure relates to a wastegate assembly in a turbine of a turbocharger.

BACKGROUND AND SUMMARY

Boosting devices, such as turbochargers, are used in engines to provide increased engine output and efficiency. However, it may be desirable to adjust the boost provided to engines based on operating conditions in the engine to improve combustion efficiency and increase power output. To enable boost adjustment, devices such as wastegates are provided to vary the amount of exhaust gas flowing through the turbine rotor, thereby adjusting the speed of the turbine and therefore the speed of the compressor in the turbocharger. As a result, the amount of boost provided to the engine can be varied based on engine operating conditions to provide increased engine efficiency and/or engine output.

However, wastegate operation may interfere with the outflow of the turbine causing backpressure build up, thereby decreasing turbine performance. As a result, turbocharger operation is negatively affected. U.S. Pat. No. 4,256,285 discloses a wastegate valve with a wing member coupled thereto. The wing member interacts with the wastegate flow to assist in valve opening during valve actuation. However, the wing member does not mitigate flow interference between the wastegate outflow and the turbine rotor outflow. Consequently, wastegate and rotor outflow mixing creates a restriction downstream of the rotor, increasing backpressure in the turbine. Therefore, turbocharger performance is negatively impacted by the wastegate disclosed in U.S. Pat. No. 4,256,285. In other prior art turbines flow diverting walls may be integrally formed with a wastegate conduit outlet to reduce flow interference between the turbine outflow and the wastegate outflow.

As such in one approach, a wastegate assembly in a turbine of an internal combustion engine is provided. The wastegate assembly includes a wastegate conduit bypassing a turbine rotor, a valve sealing plate configured to seat and seal on a wastegate conduit outlet in a closed position, and a flow diverting tab coupled to the valve sealing plate, extending upstream of the wastegate conduit outlet, and separating a wastegate conduit outflow and a turbine rotor outflow. The flow diverting tab decreases flow interference between the wastegate outflow and the turbine rotor outflow, thereby decreasing turbine backpressure and improving turbine operation. As a result, turbine efficiency and longevity is increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-4 are drawn approximately to scale, although other relative dimensions may be used.

DETAILED DESCRIPTION

Figure 6:
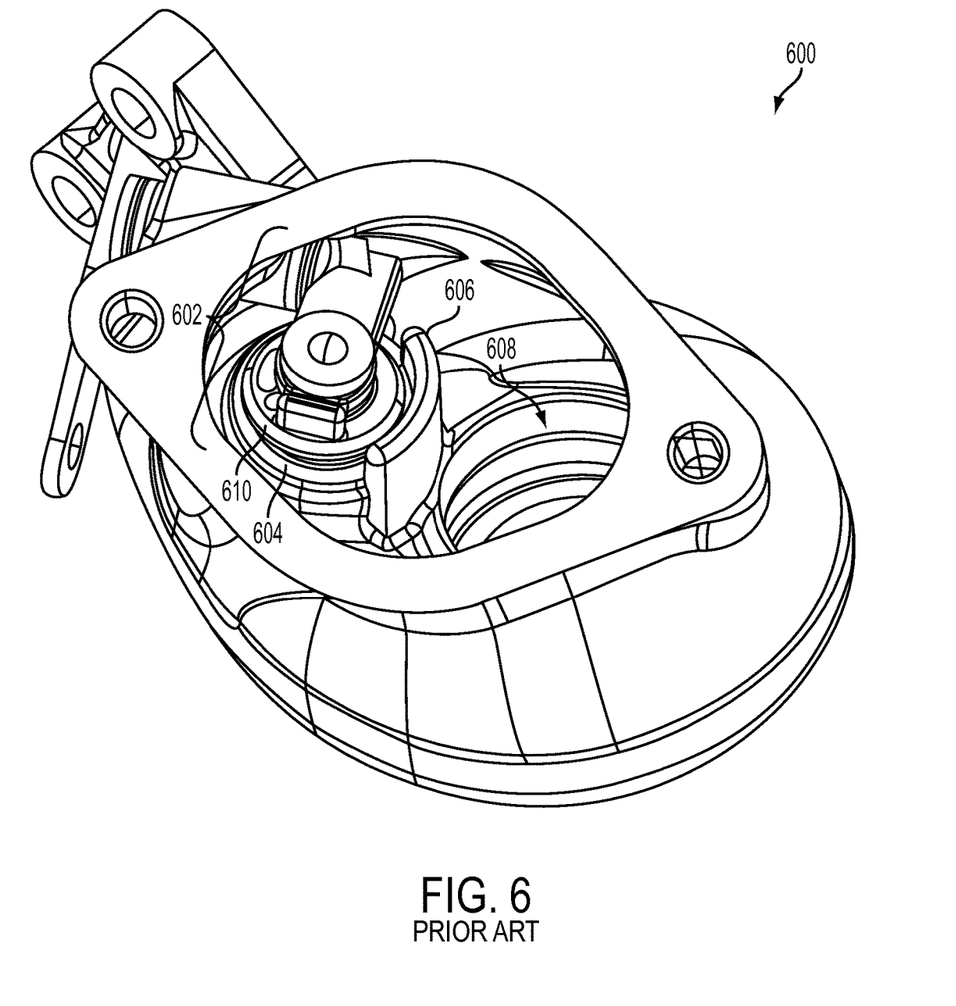
FIG. 6 shows an illustration of a prior art turbine.

FIG. 6 shows a prior art turbine 600 and wastegate valve 602. The turbine 600 also includes a wastegate conduit outlet 604 and a flow diverting wall 606. It will be appreciated, that the wall 606 may be cast integrally with a section of the turbine or may be welded to a fixed interior surface of the turbine. As shown, the flow diverting wall 606 is positioned between the outflow of the wastegate conduit outlet 604 and a turbine outlet 608 which reduces the flow interference between the wastegate outlet and the turbine outflow. It will also be appreciated that the flow diverting wall 606 is spaced away from the valve sealing plate 610. The inventors have recognized several drawbacks with the turbine 600, shown in FIG. 6. For instance, some engines and turbines may have packaging and/or tooling constraints which don't allow for this flow diverting wall. Additionally, the presence of such a wall may prevent the assembly of the wastegate components in the crowded turbine housing discharge area.

As such, a wastegate having a flow diverting tab coupling to a valve sealing plate, extending upstream of the wastegate conduit outlet, and positioned between the wastegate conduit outlet and the outlet passage, has been developed to overcome at least some of the drawbacks of the turbine 600 shown in FIG. 6 as well as other prior art turbines. The position of flow diverting tab enables interference between wastegate outflow and turbine rotor outflow to be mitigated. As a result, turbine operation can be improved during wastegate operation. Moreover, directly coupling the flow diverting tab to the valve sealing plate enables the flow diverting tab to be added to existing turbine designs at a late stage in the manufacturing process, if desired. Consequently, production cost of the turbine can be reduced.

Figure 1:
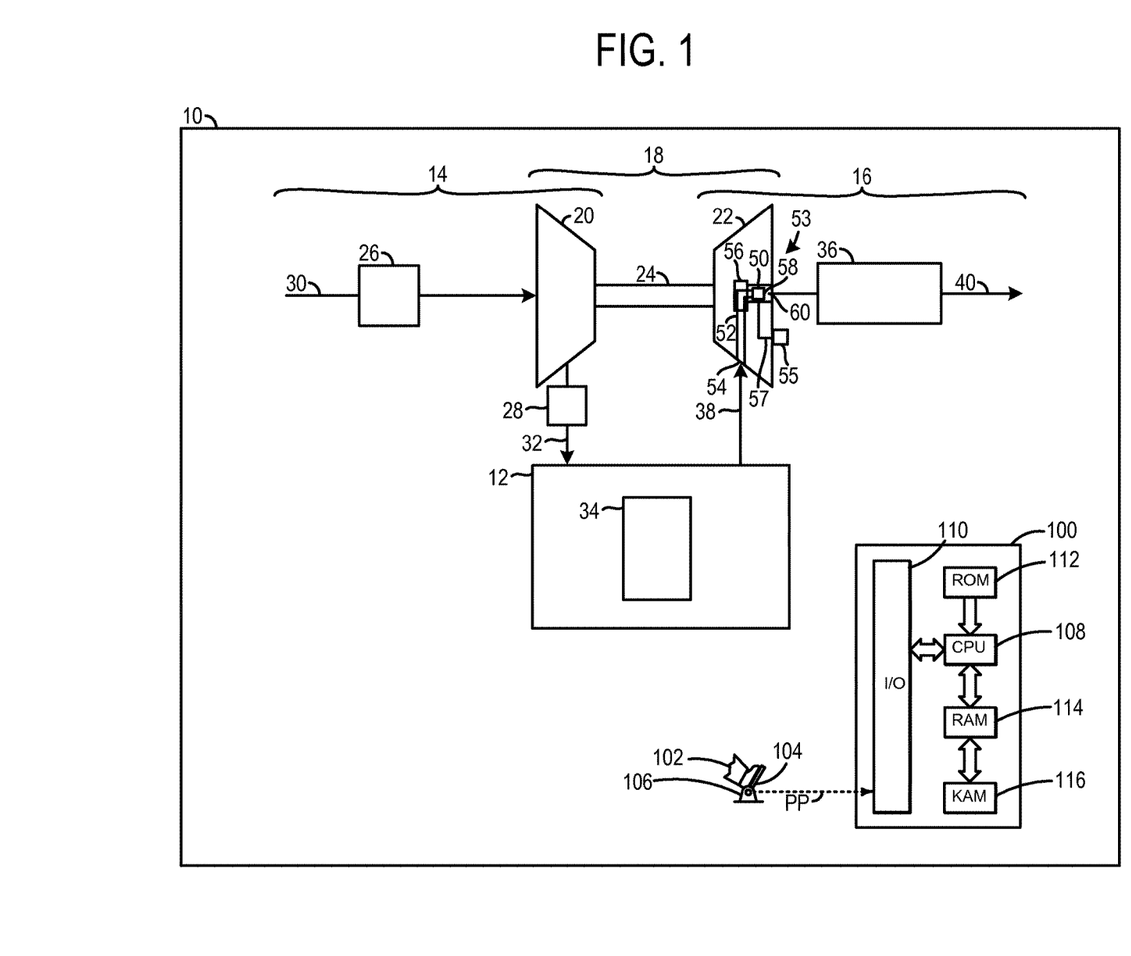
FIG. 1 shows a schematic depiction of an engine and turbocharger in a vehicle.

FIG. 1 shows a schematic depiction of a vehicle 10 including an engine 12. An intake system 14 is configured to supply intake air to the engine 12. Likewise an exhaust system 16 is configured to receive exhaust gas from the engine 12. A turbocharger 18 is also included in the vehicle 10. The turbocharger 18 includes a compressor 20 and a turbine 22. The compressor 20 is coupled to the turbine 22 via a drive shaft 24 or other suitable mechanical component configured to transfer rotational energy between the turbine and compressor.

The intake system 14 includes a filter 26 and a throttle 28. Arrow 30 depicts flow of intake air through the filter 26 and to the compressor 20. It will be appreciated that the compressor 20 may be included in the intake system 14. Additionally, arrow 32 depicts the flow of intake air from the compressor 20 to the engine 12. It will be appreciated that one or more intake conduits, manifolds, etc., can provide the aforementioned intake airflow functionality.

The engine includes at least one cylinder 34. It will be appreciated that combustion cycles may be performed in the cylinder 34. For instance, a four stroke combustion cycle may be implemented. However, other types of suitable combustion cycles have been contemplated.

Additionally, the exhaust system 16 includes the turbine 22 and an emission control device 36. The emission control device 36 may include one or more of a catalyst, filter, etc. Arrow 38 denotes the flow of exhaust gas from the engine 12 to the turbine 22. Furthermore, arrow 40 denotes the flow of exhaust gas from the turbine 22 and through the emission control device 36. It will be appreciated that one or more exhaust conduits, manifolds, etc., can provide the aforementioned exhaust gas flow functionality.

The turbine 22 includes a wastegate valve 50 coupled to a wastegate conduit 52. The wastegate valve 50 and wastegate conduit 52 are included in a wastegate assembly 53. It will be appreciated that the wastegate valve 50 and wastegate conduit 52 are integrated into the turbine 22.

The wastegate valve 50 is configured to open and close to provide desired bypass exhaust gas flow in the turbine 22. In this way, the speed of the turbine and therefore the turbocharger can be adjusted based on engine operating conditions through adjustment of the wastegate valve 50. The wastegate valve 50 is coupled to an actuator 55 via mechanical coupling component(s) 57. The mechanical coupling between the wastegate valve 50 and the actuator is described in greater detail herein.

The wastegate conduit 52 includes an inlet 54 positioned upstream of a turbine rotor 56 and an outlet 58 positioned downstream of the turbine rotor 56. In this way, the wastegate conduit 52 bypasses the turbine rotor 56. It will be appreciated that the wastegate valve 50 may be coupled to the outlet 58. It will also be appreciated that a turbine rotor outflow and a wastegate conduit outflow converge at a location 60 downstream of the wastegate conduit outlet and rotor outlet. This location may be referred to as a confluence section. The wastegate valve and wastegate conduit are schematically depicted in FIG. 1. However, the wastegate valve and wastegate conduit have additional geometric complexity that is described in greater detail herein.

A controller 100 may be included in the vehicle 10. The controller 100 may be configured to receive signals from sensors (e.g., temperature sensors, engine speed sensors, exhaust gas composition sensors, etc.,) in the vehicle and engine as well as send command signals to vehicle and engine components. Various components in the vehicle 10 and the engine 12 may be controlled at least partially by a control system including the controller 100 and by input from a vehicle operator 102 via an input device 104. In this example, input device 104 includes an accelerator pedal and a pedal position sensor 106 for generating a proportional pedal position signal PP. The controller 100 is shown in FIG. 1 as a microcomputer, including processor 108 (e.g., microprocessor unit), input/output ports 110, an electronic storage medium for executable programs and calibration values shown as read only memory 112 (e.g., read only memory chip) in this particular example, random access memory 114, keep alive memory 116, and a data bus. Storage medium read-only memory 112 can be programmed with computer readable data representing instructions executable by processor 108 for performing the methods described below as well as other variants that are anticipated but not specifically listed. The controller 100 is configured to send a control signal to the wastegate valve 50. Additionally, it will be appreciated that the controller may be configured to send control signals to additional components.

Figure 2:
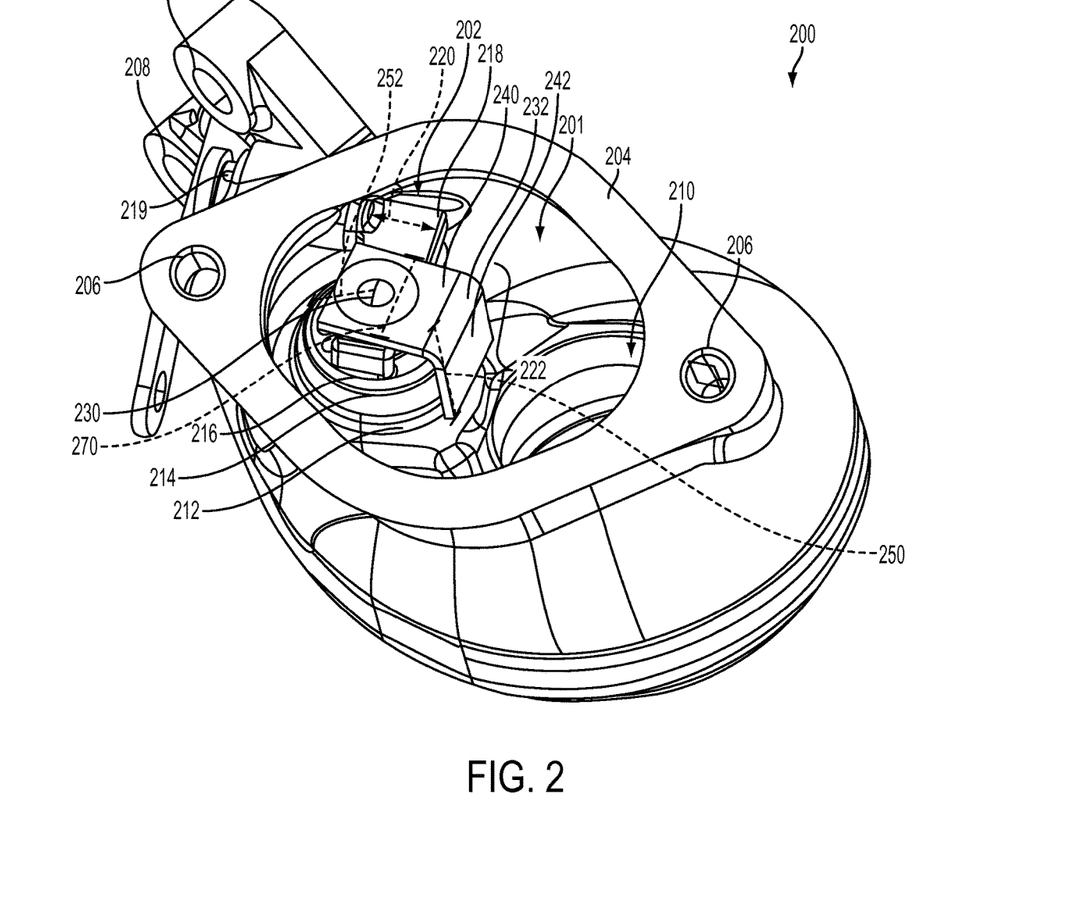
FIG. 2 shows an exemplary turbine and wastegate valve.

FIG. 2 shows an illustration of a first example turbine 200, wastegate assembly 201 including the wastegate valve 202. The turbine 200 and wastegate valve 202. The turbine 200 may be included in the vehicle 10 shown in FIG. 1. Therefore, the turbine 200 may be the turbine 22, shown in FIG. 1, and the wastegate valve 202 may be the wastegate valve 50, shown in FIG. 1.

The turbine 200 includes a housing 204. The housing 204 includes openings 206 configured to attach to downstream components such as an exhaust conduit, emission control device, etc. The housing 204 includes additional openings 208 configured to attach to other vehicle and/or engine components.

A rotor outlet passage 210 configured to receive exhaust gas from a turbine rotor is illustrated in FIG. 2. It will be appreciated that exhaust gas flows from a rotor (not shown) to the rotor outlet passage 210. A wastegate conduit 212 and the outlet 214 (i.e., wastegate conduit outlet) of the conduit is also shown in FIG. 2. As previously discussed, the wastegate conduit bypasses the turbine rotor. As illustrated in FIG. 2, the wastegate valve 202 includes a valve sealing plate 216 configured to seat and seal on the wastegate conduit outlet 214 in a closed position. It will be appreciated that FIG. 2 depicts the wastegate valve 202 in a closed position. The valve sealing plate 216 is coupled to an actuation arm 218. The actuation arm 218 is coupled to an actuator, such as actuator 55, shown in FIG. 1, to move the valve sealing plate relative to the passage that it fully covers/blocks when fully closed. The valve sealing plate may translate and/or rotate relative to the housing and bypass opening during operation of the turbocharger.

Additional structural components provide the mechanical coupling between the valve sealing plate 216 and the actuator, such as an actuation component 219 extending through the housing 204. The actuator arm 218 and valve sealing plate 216 pivot about an axis 220 of the actuation component 219. Thus, the actuation arm 218 is configured to rotate about the axis 220 in response to input from the actuator. Thus, the valve sealing plate 216 is spaced away from the wastegate conduit outlet 214 when the wastegate valve 202 is configured in an open position. The spacing away may include both longitudinal motion parallel to a central axis of the conduit and/or rotating motion about a pivot axis.

The wastegate assembly 201 further includes a flow diverting tab 222. The flow diverting tab 222 extends upstream of the wastegate conduit outlet 214 to separate a wastegate conduit outflow and a turbine rotor outflow. Arrow 224 denotes the general flow of exhaust gas out of the wastegate conduit when the wastegate valve 202 is in an open position. The flow diverting tab 222 extends upstream of the wastegate conduit outlet 214 when the wastegate valve is in a closed position where the valve sealing plate 216 is seated and sealed on the wastegate valve outlet 214. Additionally, the flow diverting tab 222 may extend upstream of the wastegate conduit outlet 214 when the wastegate valve is an open position. The flow diverting tab 222 is positioned between the wastegate conduit outlet 214 and the rotor outlet passage 210. In this way, when the wastegate is in an open position, flow interference between the wastegate conduit outflow and the turbine rotor outflow is reduced.

In the example depicted in FIG. 2, the flow diverting tab 222 is coupled (e.g., directly coupled, for example, without intervening components therebetween, that induce relative motion therebetween) to the valve sealing plate 216. In one example, the flow diverting tab 222 and the valve sealing plate 216 form a continuous shape. However, in other examples the tab and plate may not form a continuous shape. Further in one example, the flow diverting tab 222 may be coupled to the valve sealing plate 216 via a welded joint. Additionally or alternatively, the flow diverting tab 222 may be coupled to the valve sealing plate 412 via an attachment device (e.g., bolt, screw, etc.) In yet another example, the valve sealing plate and the flow diverting tab may be cast as a single component Furthermore, the flow diverting tab 222 includes a first surface 240 and a second surface 242. In the depicted example, the first surface 240 is perpendicular to the second surface 242. Additionally, the first and second surfaces are planar. Additionally, the second surface 242 is parallel to a central axis 230 of the wastegate conduit outlet 214. Furthermore, the first surface 240 is perpendicular to the central axis 230. However, other flow diverting tab surface contours, orientations, etc., have been contemplated. It will be appreciated that the flow diverting tab 222 extends in an axial direction with regard to the central axis 230 of the wastegate conduit outlet 214.

In another example, the first surface 240 of the flow diverting tab 222 may be curved. In such an example, the curvature of the first surface of the flow diverting tab may be similar to a contour of an external surface of the wastegate conduit outlet 214. However, other flow diverting tab contours have been contemplated. The curvature of the tab provides additional wastegate flow field control.

A third surface 232 joining the first and second surfaces (240 and 242) of the flow diverting tab 222 is curved, in the depicted example. However, other flow diverting tab contours have been contemplated. It will be appreciated that when the flow diverting tab 222 is located between the two flow paths (i.e., turbine outflow and wastegate outflow) when the wastegate valve is in an open position (e.g., high lift position) during normal operation. However, in some examples the wastegate valve may be opened by greater amount than the high lift position during certain engine operating conditions, such as a cold start. In such an example, the flow diverting tab may not fully extend upstream of the wastegate conduit outlet. However, other flow diverting tab contours have been contemplated.

In the example of FIG. 2, the flow diverting tab may be formed from sheet metal cut and bent into the position illustrated, and positioned to move with the valve sealing plate.

In one example, the flow diverting tab 222 and the valve sealing plate 216 are constructed out of different materials. However in another example, the flow diverting tab 222 and the valve sealing plate 216 may comprise similar materials. Exemplary materials may include an alloy such as high temperature alloys, alloys with high nickel content, etc. The flow diverting tab 222 may be a solid piece of said material bent into the shape illustrated and/or described herein.

Additionally, a width 270 of the flow diverting tab 222 is less than a diameter of the wastegate conduit outlet. It will be appreciated that the diameter is twice the magnitude of the radius 252. When the flow diverting tab is constructed in this way the generation of turbulence via the wastegate is reduced.

In one example, the flow diverting tab 222 may be cast, forged, or molded integrally with the wastegate valve 202 and specifically the valve sealing plate 216 in the wastegate valve. Therefore in one example, the flow diverting tab may be integrally formed with the valve sealing plate. Additionally, the tab may be integrated or attached to the sealing plate or valve arm by various manufacturing methods.

Figure 3:
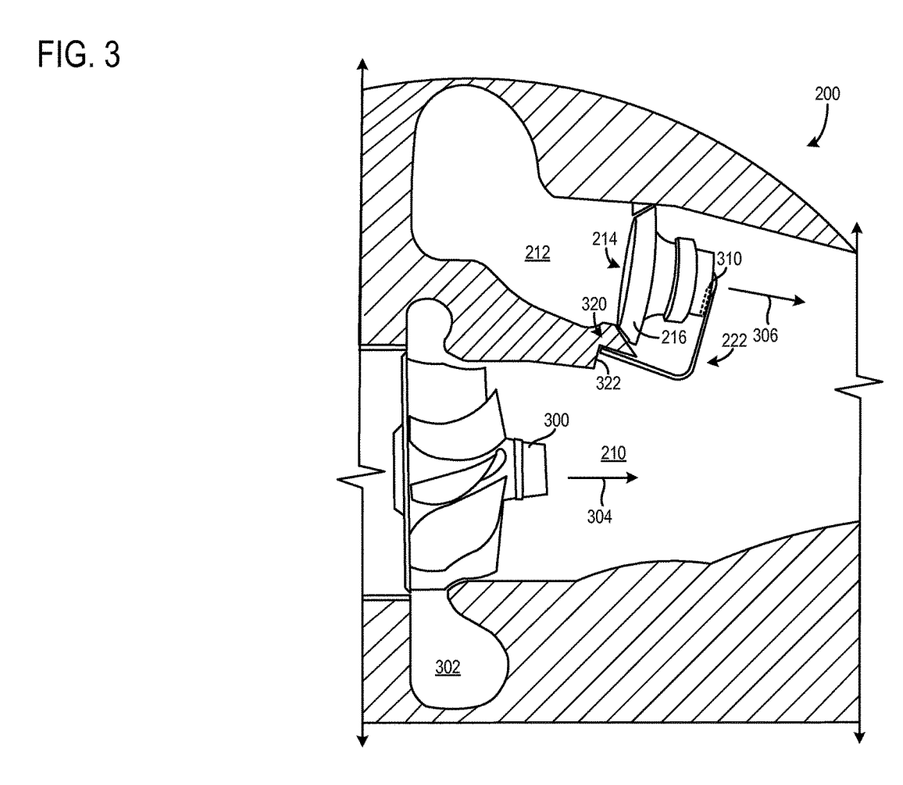
FIG. 3 shows a cross-sectional view of the turbine and wastegate valve shown in FIG. 2.

FIG. 3 shows a cross-sectional view of the turbine 200 and wastegate valve 202 shown in FIG. 2. The valve sealing plate 216 is seated and sealed on the wastegate conduit outlet 214 in a closed position, in the depicted example. However in the open position the valve sealing plate is spaced away from the wastegate conduit outlet. The wastegate conduit 212, rotor outlet passage 210, and turbine rotor 300, are also shown in FIG. 3. A turbine rotor inlet passage 302 supplying exhaust gas to the turbine rotor 300 is also shown in FIG. 3. The rotor outlet passage 210 configured to receive exhaust gas from the turbine rotor 300 is also shown in FIG. 3. Additionally, the flow diverting tab 222 coupled to the valve sealing plate 216. As previously discussed, the flow diverting tab 222 may be coupled to the valve sealing plate 216 via a welded joint 310.

Arrow 304 depicts a general outflow of the turbine rotor 300. Furthermore, arrow 306 depicts a general outflow of the wastegate conduit 212 when the wastegate valve is in an open position. The flow diverting tab 222 decreases interference between the wastegate conduit outflow and the turbine rotor outflow. It will be appreciated that the flow patterns in the turbine 200 have greater complexity that is not depicted.

FIG. 3 also shows a section 320 of an interior surface of the turbine 200 which extends downstream of the wastegate conduit outlet 214. The extension of section 320 downstream of the wastegate conduit outlet enables flow interference between the wastegaste outflow and turbine rotor outflow to be reduced. Specifically, extending section 320 downstream of the outlet enables flow interference reduction when the wastegate valve is in an open position where the flow diverting tab doesn't extend upstream of the outlet. As shown, the section 320 includes a shelf receiving the flow diverting tab 222 when the wastegate is in the closed position. Thus, the flow diverting tab 222 overlaps a portion of the section 320 when the wastegate is in the close position. Additionally, the section 320 provides a surface which enables the sealing plate to seat and seal thereon.

Figure 4:
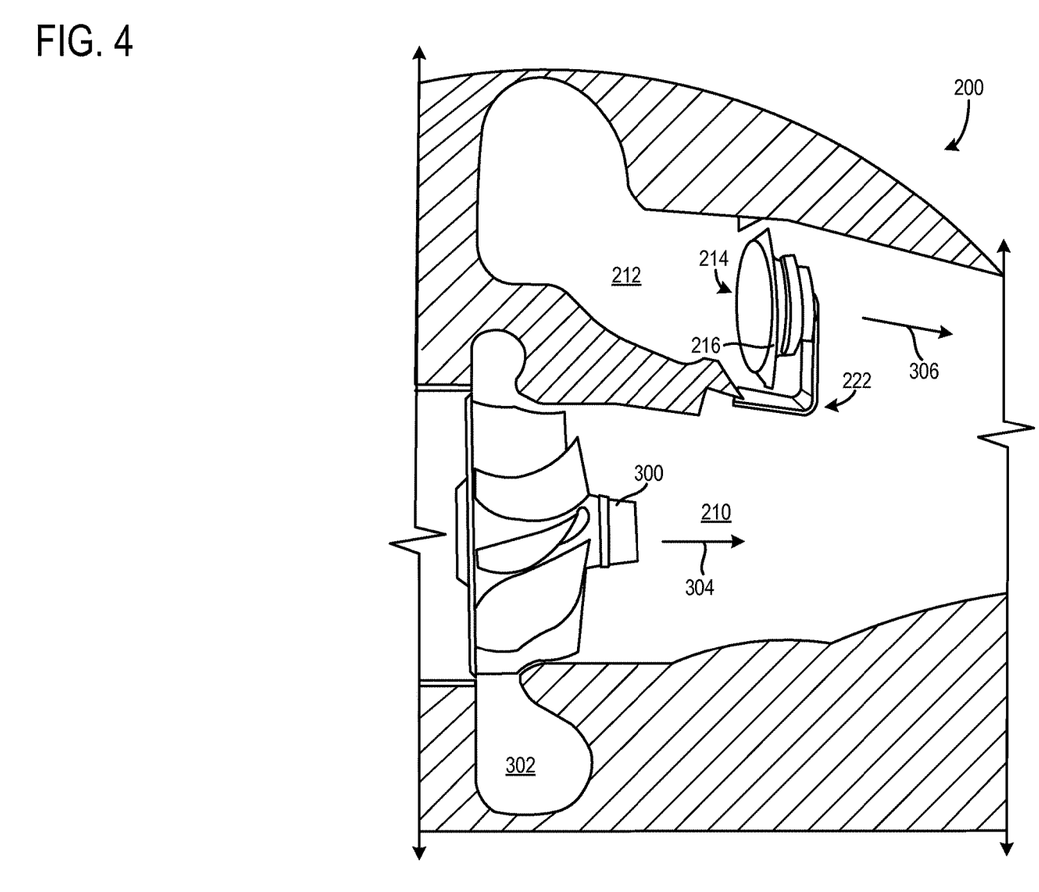
FIG. 4 shows a cross-sectional view of the turbine and wastegate valve shown in FIG. 2 in an open configuration.

FIG. 4 shows a cross-sectional view of the turbine 200 and wastegate valve 202 illustrated in FIG. 2 in an open position. The flow diverting tab 222 extends upstream of the wastegate conduit outlet 214 of the wastegate conduit 212 and is positioned between the turbine rotor outflow 304 and the wastegate conduit outflow 306 when the wastegate valve 202 is in an open position. Again the turbine rotor 300, turbine rotor inlet passage 302, and rotor outlet passage 210 are shown.

Figure 5:
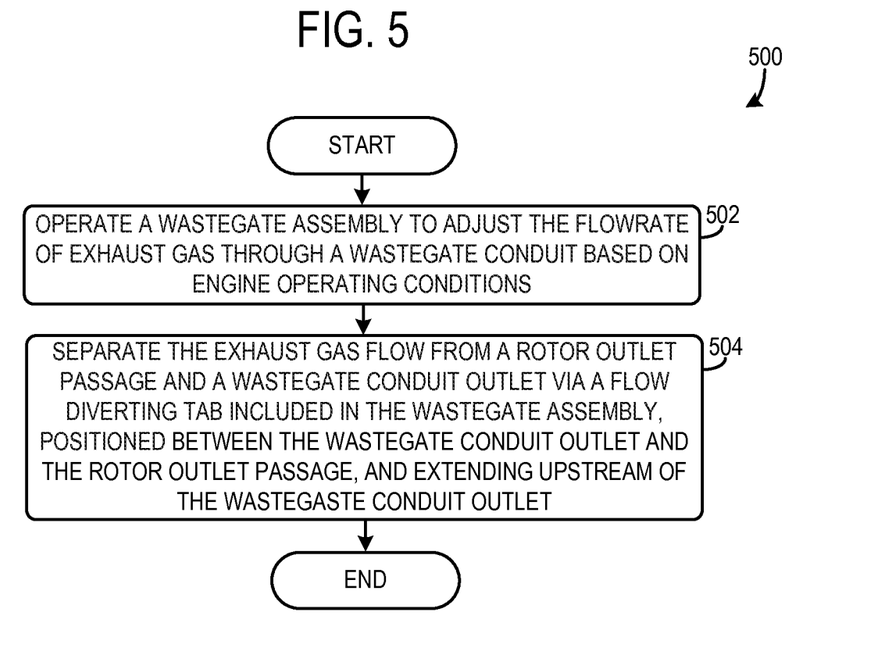
FIG. 5 shows a method for operation of a turbocharger.

FIG. 5 shows a method 500 for operation of a turbine. The method 500 may be implemented via the turbines described above with regard to FIGS. 1-4 or may be implemented via another suitable turbine.

At 502 the method includes operating a wastegate assembly to adjust the flowrate of exhaust gas through a wastegate conduit based on engine operating conditions. At 504 the method includes separating the exhaust gas flow from a rotor outlet passage and a wastegate conduit outlet via a flow diverting tab included in the wastegate assembly, positioned between the wastegate conduit outlet and the rotor outlet passage, and extending upstream of the wastegate conduit outlet.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A wastegate assembly in a turbine of an internal combustion engine comprising:
a wastegate conduit bypassing a turbine rotor;
a valve sealing plate configured to seat and seal on a wastegate conduit outlet in a closed position; and
a flow diverting tab coupled to the valve sealing plate, extending upstream of the wastegate conduit outlet, and separating a wastegate conduit outflow and a turbine rotor outflow, where an external surface of the flow diverting tab is parallel to a central axis of the wastegate conduit outlet when the valve sealing plate is in an open position and the closed position.

2. The wastegate assembly of claim 1, where the flow diverting tab is coupled to an interior surface of the turbine.

3. The wastegate assembly of claim 2, where a width of the flow diverting tab is less than a diameter of the wastegate conduit outlet.

4. The wastegate assembly of claim 1, where the flow diverting tab extends upstream of the wastegate conduit outlet when the valve sealing plate is in the closed position.

5. The wastegate assembly of claim 1, where the flow diverting tab is curved.

6. The wastegate assembly of claim 1, further comprising an actuation arm coupling the valve sealing plate and an actuator.

7. The wastegate assembly of claim 6, where the actuation arm is configured to rotate in response to input from the actuator.

8. The wastegate assembly of claim 1, where the flow diverting tab and the valve sealing plate are constructed out of different materials.

9. The wastegate assembly of claim 1, where the flow diverting tab and the valve sealing plate form a continuous shape.

10. The wastegate assembly of claim 1, where the flow diverting tab and the valve sealing plate comprise a same material.

11. The wastegate assembly of claim 1, where the flow diverting tab extends upstream of the wastegate conduit outlet when the valve sealing plate is in the open position where the valve sealing plate is spaced away from the wastegate conduit outlet.

12. The wastegate assembly of claim 1, where the flow diverting tab is coupled to the valve sealing plate via a welded joint or attachment device.

13. A turbine in a turbocharger for an internal combustion engine comprising:
an inlet passage supplying exhaust gas to a rotor;
a rotor outlet passage receiving exhaust gas from the rotor;
a wastegate conduit coupled to the inlet passage and the outlet passage;
a valve sealing plate configured to seat and seal on a wastegate conduit outlet in a closed position; and
a flow diverting tab coupled to the valve sealing plate extending upstream of the wastegate conduit outlet and positioned between the wastegate conduit outlet and the rotor outlet passage, where an external surface of the flow diverting tab is parallel to a central axis of the wastegate conduit outlet when the valve sealing plate is in an open position and the closed position.

14. The turbine of claim 13, where the flow diverting tab is curved.

15. The turbine of claim 13, where the flow diverting tab is integrally formed with the valve sealing plate.

16. A wastegate assembly in a turbine of an internal combustion engine comprising:
a wastegate conduit bypassing a turbine rotor;
a valve sealing plate configured to seat and seal on a wastegate conduit outlet in a closed position; and
a flow diverting tab coupled to the valve sealing plate, extending upstream of the wastegate conduit outlet, and positioned directly downstream of a confluence of the wastegate conduit outflow and turbine rotor outflow to separate the wastegate conduit outflow from the turbine rotor outflow, where an external surface of the flow diverting tab is parallel to a central axis of the wastegate conduit outlet when the valve sealing plate is in an open position and the closed position.

17. The wastegate assembly of claim 16, where the flow diverting tab includes a first surface directly coupled to the valve sealing plate and a second surface arranged perpendicular to the first surface.

18. The wastegate assembly of claim 16, where the flow diverting tab extends upstream of the wastegate conduit outlet when the valve sealing plate is in the open position.

* * * * *